3,346,521
POLYOLEFIN-FUSIBLE CELLULOSE ETHER BLENDS

Bruce A. Fairbairn, Joseph M. Grenier, and Arthur Holmes, Drummondville, Quebec, Canada, assignors to Chemcell Limited, Montreal, Quebec, Canada
No Drawing. Original application Feb. 23, 1962, Ser. No. 175,292, now Patent No. 3,232,694, dated Feb. 1, 1966. Divided and this application Aug. 27, 1965, Ser. No. 483,319
Claims priority, application Canada, Feb. 21, 1962, 842,883
11 Claims. (Cl. 260—17)

This invention relates to improved materials and structures based on polyolefins, especially polyethylene and polypropylene, and this application is a division of application Ser. No. 175,292, filed Feb. 23, 1962.

Polyethylene and polypropylene are used in making many types of shaped articles. In particular, polypropylene of the isotactic type, which is capable of being highly crystallized, provides strong tough fibers, filaments, and like structures. However, polyolefins have proved difficult to dye with any significant depth or shade fastness or graduation of shade. Certain chemical treatments have been proposed to modify the surface of the polyolefin structure to impart superficial dyeing characteristics as have various severe dyeing processes. The addition of small amounts of materials, usually employed to stabilize the polyolefins against the degrading action against heat and light, may impart a small degree of dyeability. Also, polyolefin structures may be coloured by the addition of pigments prior to the structure formation. Nevertheless, these expedients fail to provide polyolefin structures which may be readily dyed to produce the effects required commercially.

The present invention provides improved shaped structures of polyolefins which are readily dyeable by disperse, azoic and vat dyes and also provides means for producing dyeable polyolefins, in particular those based on certain polyethylenes and on highly crystallizable isotactic polypropylene.

This is accomplished in accordance with the invention, by dissolving in the polyolefin a material selected from the group consisting of fusible cellulose ethers and substituted cellulose ethers. The solution is accomplished by intimately blending the components before the structures have been formed by melting and shaping. Following the teachings of the invention, the structures have substantially the same physical properties as those formed from the polyolefin alone.

A preferred polyolefin component of these blends is polyethylene which may preferably be any of the commercially available types with densities ranging from about 0.910 to about 0.960 and melt indices (ASTM D-1238-52T) from about 0.2 to about 10.0. Variation within these ranges will depend on the desired properties of the shaped structure. Another preferred polyolefin for the purposes of the invention is polypropylene, the preferred form of which is the so-called isotactic type which is readily crystallizable and has densities ranging from about 0.89 to about 0.91 and melt indices (ASTM D-1238-57T, with load of 2,160 grams) from about 0.5 to about 10.

The materials to be dissolved with the polyolefin to provide dyeable structures are selected from the class of fusible cellulose ethers and fusible substituted cellulose ethers compatible with the polyolefins, preferably having melting points within the range from about 240° C. to about 140° C. Outside this range the solubility of the fusible cellulose ethers and fusible substituted cellulose ethers in the polyolefin and consequently the tensile strength, elongation, flex resistance and other physical properties of the shaped structures are markedly less. The preferred melting point range is from 195° C. to 160° C. It is to be therefore understood that both the cellulose ethers and the substituted cellulose ethers employed in the invention are fusible. Fusible, as used herein, means the capacity of the cellulose ether or the substituted cellulose ether to be reduced to a liquid or fluid state at elevated temperatures up to 300° C. for a time sufficient for processing without being seriously degraded as a consequence of the elevated temperatures.

A further means of characterizing a suitable type of fusible cellulose ether or fusible substituted cellulose ether is the intrinsic viscosity measured in the appropriate solvent at 20° C. A solvent mixture of 80 parts toluene and 20 parts ethanol by weight is suitable for most of the ethers. Those few which are not readily soluble in toluene-ethanol may be dissolved in a mixture of 95 parts acetone and 5 parts water by weight. Suitable fusible cellulose ethers or fusible substituted cellulose ethers have an intrinsic viscosity within the range from 0.4 to 3.5 deciliters per gram, which corresponds to a degree of polymerization of the cellulose backbone of the ethers of about 95 to 850 anhydroglucose units. The preferred range of intrinsic viscosities is from 0.6 to 2.9 deciliters per gram, within which range the fusible cellulose ethers and fusible substituted cellulose ethers show good compatibility with the polyolefins in which they are dissolved and the shaped structures show good physical properties in addition to the property of being readily dyed.

Fusible cellulose ethers within the spirit of the invention may be prepared by the reaction of alkyl or aryl halides on cellulose pretreated with an alkali, for example sodium hydroxide. The preferred melting point range is achieved by controlling the degree of substitution which will vary according to the ether group. The intrinsic viscosity is controlled by the severity of the reaction conditions or selection of the cellulose raw material as is known to those skilled in the art. The ethers may be single or mixed ethers, for example, ethyl, propyl, butyl, hydroxy ethyl, hydroxy propyl, hydroxy butyl, benzyl, lauryl, stearyl, oleyl, methyl ethyl, methyl propyl, methyl butyl, methyl hydroxyethyl, methyl hydroxypropyl, methyl hydroxy-butyl, methyl benzyl, methyl lauryl, methyl stearyl, methyl oleyl, ethyl propyl, ethyl butyl, ethyl hydroxy-ethyl, ethyl hydroxy-propyl, ethyl hydroxy-butyl, ethyl benzyl, ethyl lauryl, ethyl stearyl, ethyl oleyl, propyl butyl, propyl hydroxy-ethyl, propyl hydroxy-propyl, propyl hydroxy-butyl, propyl benzyl, propyl lauryl, propyl stearyl, propyl oleyl, butyl hydroxy-ethyl, butyl hydroxy-propyl, butyl hydroxy-butyl, butyl benzyl, butyl lauryl, butyl stearyl, butyl oleyl, benzyl hydroxy-ethyl, benzyl hydroxy-propyl, benzyl hydroxy-butyl, ethylamino ethyl, ethylamino propyl, ethylamino butyl, ethylamino benzyl, ethylamino lauryl, ethylamino stearyl and ethylamino oleyl ethers of cellulose.

The fusible substituted cellulose ethers are cellulose ether esters and are formed by the acylation of incompletely etherified cellulose ethers of the type hereinbefore described. Suitable fusible substituted cellulose ethers, in accordance with the invention, are the acetate, propionate, butyrate, laurate, stearate and oleate esters of the aforementioned fusible cellulose ethers. Methyl cellulose, which is not a fusible cellulose ether, may be similarly acylated to form fusible substituted cellulose ethers. By controlling the degree of substitution and the degree of polymerization of the cellulose by means well known to those skilled in the art, fusible substituted cellulose ethers with melting points and intrinsic viscosities within the desired ranges are readily obtained.

For the purposes of the present invention, the amount of fusible cellulose ether or substituted cellulose ether in the composition should be within the range from about 5% to about 50% by weight, in order to achieve, on the one hand adequate depth of shade in dyeing, and on the other, to prevent loss in physical properties in terms of the polyolefin. However, above about 20% the resultant depth of shade in dyeing does not increase substantially. A preferred range of the amount of the fusible cellulose ether or fusible substituted cellulose ether is from about 10% to about 15% by weight.

The improved structures of the invention are formed by dissolving the fusible cellulose ether in the polyolefin and melting and extruding the desired shaped articles therefrom. Mixing is readily accomplished by milling between hot rolls or by blending the ingredients in powder form. An optically clear homogeneous solution of the fusible cellulose ether in the polyolefin results from the melting prior to extrusion.

Extrusion may be accomplished by any of the conventional means used with polyolefins since it is a feature of the invention that extrusion conditions for the mixture of polyolefin and fusible cellulose ether vary only slightly, if at all, from conditions used with conventional polyolefins.

The shaped articles formed from the polyolefin and fusible cellulose ether or fusible substituted cellulose ether are homogeneous, retain all the desirable physical properties, and may be readily dyed to deep uniform shades that exhibit high fastness to washing, light, rubbing and dry cleaning.

Useful shaped dyeable articles, which may be formed according to the invention, include films or sheets with gauges ranging from 1 mil or so up to several hundred mils. The films may be oriented if desired to improve strength. Filaments suitable for textile and other uses with deniers ranging from 2 or 3 up to several hundred and having tenacities ranging from 2 or 3 grams per denier up to 9 or 10 grams per denier are other useful articles.

Fabrics of many types, which may be readily dyed, may be woven or knitted from such filaments and will have light weight, high tear strength and abrasion resistance, may be permanently pleated and so forth. The color fastness of such dyed fabrics will be equal to that of most other fabrics commercially available today.

Dyeing may be accomplished by conventional methods using "disperse dyestuffs" of the type generally used to color acetate or nylon fibers and the dyeing is found to be uniform through the cross-section of the article. "Disperse dyes" are organic colors applied from near-colloidal aqueous dispersions. The two principal groups in this class are the dispersed azos, represented by Color Index Disperse Yellow 3 which is the reaction product of coupling diazotized p-aminoacetanilide to p-cresol, and the dispersed anthraquinones represented by 1-amino-4-hydroxy-2-methoxy anthraquinone (Color Index Disperse Red 4) and by 1,4-bis(methyl amino) anthraquinone (Color Index Disperse Blue 14). Most other disperse dyestuffs, sold commercially under various trade names, are satisfactory for dyeing the improved shaped articles of the invention. No exotic pretreatments or dyeing conditions are necessary to accomplish satisfactory dyeing. Standard methods, like those used to dye acetate and nylon fibers, are employed. Carriers may be used to increase the rate of dyestuff exhaustion.

Dyeing may also be readily accomplished by using "azoic dyes." Typical azoics are formed from the diazotization of coupling agents such as Naphtol AS–OL (3-hydroxy - 2 - naphth - o - anisidine—AATCC prototype No. 311) or Naphtol AS–LB (4'-chloro-2-hydroxy-3-carbazole carboxanilide—prototype No. 387) with bases such as Fast Red B Base (4-nitro-o-anisidine—Color Index 117) of Fast Scarlet R Base (5-nitro-o-anisidine—Color Index 118) or Fast Garnet GBC Base (o-amino azotoluene—Color Index 17).

Still another class of dyestuffs suitable for dyeing according to the invention is the "vat dyes." Typical vat dyes are 3-carbazoylamino phenol sold as Ciba Blue 2RH (Color Index Vat Blue 43) or methyl 16,17-dihydroxy violanthrone sold as Caledon Jade Green XN (Color Index Vat Green 1) or the condensation product of 2,6-dibenzamidoanthraquinone with benzaldehyde and sulfur sold as Cibanone Yellow GC (Color Index Vat Yellow 2) or the condensation product of 1,4-diaminoanthraquinone with 1-chloroanthraquinone sold as Ponsol Brown RBT (Color Index Vat Brown 1).

If an amino substituted fusible cellulose ether is used in the blend with a polyolefin, the resultant shaped structure may be dyed with "wool dyes." These include neutral dyestuffs such as the sodium salt of m-sulfobenzene-azo-α - naphthalene - azo - p - tolyl - α - naphthylamine - 8 - sulfonic acid sold as Sulfon Cyanine Blue GR (Color Index 289) and the sodium salt of 4-o-chloro-p-sulfo-o-toluene - azo - 1 - p - sulfo - o - chloro - o - toluene - 5 - hydroxy-pyrazolo-3-carboxylic acid sold as Polar Yellow 5G (Color Index 642) or acid dyestuffs such as the sodium salt of m-xylene-azo-B-naphthol-3:6-disulfonic acid sold as Ponceau R (Color Index 79) and the sodium salt of α-naphthalene-azo-B-naphthol-3:6-disulfonic acid sold as Fast Red B (Color Index 88) and the sodium salt of 3:6-disulfo - 8 - hydroxy-α-naphthalene-azo-ethyl-α-naphthylamine sold as Sulfon Acid Blue (Color Index 208) or prematellized dyestuffs such as chrome complex of 1-naphthol-8-sulfonic acid sold as Neolan Blue GG (Prototype No. 144) and chrome complex of 3-methyl-1-(4-sulfo-o-tolyl)-5-pyrazolone sold as Palatine Fast Yellow ELN (Prototype No. 330).

It is to be realized that, as with all dyestuffs on various substrates, varying degrees of affinity and fastness may be obtained by the selection of individual dyestuffs from the several classes. It is incumbent on the dyer of the shaped structures of the invention to select the particular dyestuff required for a given shade, depth and fastness. It has been found that, while the general classes of wool, azoic, and vat dyes as previously described give good results, the preferred dyestuffs yielding good shade and fastness to light, washing, dry cleaning, and crocking are the disperse dyes.

No special techniques, equipment or processing conditions are required and full color value can be obtained under standard dyeing cycle conditions. For heavy shades, there is some advantage in the use of dye carriers, but contrary to other hydrophobic fibers, high temperatures are not necessary and conventional temperatures of 75° C. to 85° C. are sufficient. On the other hand with regular polyolefin structures it is necessary to induce affinity for dyestuffs by special pretreatments, solvents, dye carriers, etc., and the resultant shades usually exhibit poor fastness to light, wet treatments and crocking.

It has also been found that standard desizing, scouring or bleaching processes carried out prior to dyeing do not in any way affect the dye affinity of the shaped structures of the invention which is an advantage where the structures are dyed in blends with natural or synthetic fibers requiring these treatments for satisfactory processing.

The following examples are given to illustrate specific embodiments of the invention, it being understood that these examples are not intended as limiting. It is to be understood that in the examples any of the fusible cellulose ethers and fusible substituted cellulose ethers, as defined herein, may be substituted in like amount for those given in the examples. Likewise, the dyestuffs are only specific examples of a large number of dyestuffs, in the class, that will give satisfactory results. All proportions given are by weight.

*Example 1*

9 parts of polyethylene having a density of 0.92 and a melt index of 7.2 were intimately mixed with 1 part of methyl cellulose acetate having a melting point of 165° C., an intrinsic viscosity of 0.6 decilitres per gram in 95 parts acetone and 5 parts of water at 25° C. The methyl cellulose acetate had a degree of substitution of 1.4 methoxyl and 1.3 acetyl groups per anhydroglucose unit. The resultant mixture was melted to a clear solution and cast into a tough, clear, flexible film which could be dyed to a uniform deep shade of blue in a dyebath containing 1% 1,4-bis(methyl amino)anthraquinone and 0.5% of a chlorinated hydrocarbon carrier. A film cast from the polyethylene alone had similar physical properties but could not be dyed.

*Example II*

9 parts of a highly isotactic crystallizable polypropylene containing stabilizers against light and heat degradation and having a melt index of 3.5 and a specific gravity of 0.905 were intimately mixed with 1 part of ethyl cellulose having a melting point of 170° C., an intrinsic viscosity in 80 parts of toluene and 20 parts ethanol at 25° C. of 2.3 decilitres per gram and a degree of substitution of 2.5 ethoxy groups per anhydroglucose unit. The resulting mixture was melted in an extruder and was extruded to form an optically clear textile yarn with a tenacity of 4–5 grams per denier and an elongation of 30–40% after stretching. The yarn was knitted into a fabric which was dyed in a bath containing 1% Artisil Orange RFL (Color Index Disperse Orange 3) and 0.5% of a chlorinated hydrocarbon carrier at 85° C. for 90 minutes. The fabric dyed to a uniform shade of orange having good fastness properties.

*Example III*

The fabric of Example II was dyed in a bath containing 0.55% N,N-azo benzene-azo-3-methyl-p-phenol sold as Resolene Yellow 5R, 0.17% N,N-p-nitrobenzene azo aniline sold as Artisil Orange RFL, and 0.025% Resolene Blue FBL, a substituted anthraquinone whose exact structure is not known, at 85° C. for 90 minutes. The exact chemical structure of these dyestuffs is not known but they are members of the group of disperse dyestuffs as hereinbefore exemplified which are commonly used to dye acetate, nylon and polyethylene terephthalate fibers.

The fabric dyed to a uniform deep gold shade which showed the following fastness properties Light—40 hrs. _____ 3+
Washing _____ 5
Dry cleaning _____ 4
Crocking, wet and dry _____ 5 on a scale where 5 represents no change and 1 represents severe loss. A yarn extruded from the polypropylene alone of Example II had similar physical properties but when knitted into a fabric it could be dyed only to a weak gold shade with very poor fastness.

*Example IV*

The polypropylene-ethyl cellulose mixture of Example II was melted in an extruder and was extruded to form optically clear yarns which were woven into an upholstery fabric. The fabric was dyed by conventional means using disperse dyestuffs to a uniform dark brown shade. The fastness properties of the dyed fabric were as follows:

Light—60 hrs. _____ 3+
Commercial shampoo _____ 5
Dry cleaning _____ 2
Gas fading _____ 2+
Crocking, wet and dry _____ 5

The shade and fastness of a similar fabric made from polypropylene alone were very poor.

*Example V*

9 parts of the polypropylene of Example II were intimitely mixed with 1 part of ethyl hydroxyethyl cellulose having a melting point of 175° C. and an intrinsic viscosity in a mixture of 80 parts toluene and 20 parts ethanol at 25° C. of 0.6 decilitre per gram. The mixture was melted in an extruder and was extruded to form optically clear fibers with a tenacity of 4 grams per denier and an elongation of 35% after stretching. The fibres were knitted into a fabric which was dyed in a bath containing 1% Artisil Orange RFL for 90 minutes at 85° C. with and without a chlorinated hydrocarbon carrier. The dye affinity for the fabric when dyed without the carrier was rated fair; when dyed with the carrier the affinity was excellent.

The fastness properties of the dyed fabric were as follows:

Light—60 hrs. _____ 4+
Dry cleaning _____ 2+
Washing _____ 4+
Crocking, wet and dry _____ 4+

*Example VI*

8.5 parts of the polypropylene of Example II were intimately mixed with 1.5 parts of methyl cellulose acetate with a melting point of 175° C. and an intrinsic viscosity in a solvent mixture of 95 parts acetone and 5 parts water at 25° C. of 1.4 decilitres per gram. The methyl cellulose acetate had a degree of substitution of 1.5 methoxy and 1.3 acetyl groups per anhydroglucose unit. The mixture of polypropylene and methyl cellulose acetate was melted and extruded to form an optically clear, colourless, tough filament yarn wiht a tenacity of 5–6 grams per denier and an elongation of 25–30% after stretching. A fabric knitted from the yarn was dyed with excellent affinity with Artisil Orange RFL by the method shown in Example II. The dyed fibers shows uniform dyestuff penetration throughout the cross-section and the shade obtained was an even deep orange. The fastness properties of the dyed fabric were as follows:

Light—60 hrs. _____ 4+
Dry cleaning _____ 4
Washing _____ 4+
Crocking:
  Wet _____ 3+
  Dry _____ 4+

A fabric made from polypropylene alone showed similar physical properties but could be dyed only to a weak nebulous shade with negligible fastness.

*Example VII*

The fabric of Example VI was dyed with over seventy commercial disperse dyestuffs which showed good affinity for the fabric and generally adequate fastness.

Fifteen of the commercial disperse dyestuffs, some of whose exact chemical nature is not known but which may be illustrated by such names as 1-amino-4-(p-methoxyaniline)anthraquinone sold as Celliton Blue AF, an azo dye sold as Foron Red FL (C.I. Disperse Red 72), Eastone Scarlet R–GLF, and Artisil Yellow 6–GLF (C.I. Disperse Yellow 49), for the latter two of which the applicants have been unable to obtain further identification, showed affinity and fastness properties equal to or better than those of Artisil Orange RFL previously cited.

*Example VIII*

The fabric of Example VI was dyed with good affinity and adequate fastness with vat dyestuff Caledon Jade Green XN (C.I. Vat Green I) and with similar good affinity and fastness with azoic dyestuff Naphtol AS–OL (Pr. 311) coupled with Fast Red B Base (C.I. 117). Similar fabric from polypropylene alone could not be dyed with any substantial degree of affinity, uniformity or fastness by these dyestuffs.

We claim:

1. A dyeable shaped material consisting essentially of a polyolefin selected from the group consisting of polyethylene and polypropylene and having dispersed therein a conditioning agent selected from the group consisting of fusible cellulose ethers and fusible substituted cellulose ethers having a melting point of from about 140 to about 240° C. and an intrinsic viscosity in solvent solution of from about 0.4 to about 3.5 deciliters per gram, said conditioning agent being present in an amount of from about 5% to about 50% by weight of the shaped material whereby said material is rendered more receptive to dyeing by the presence of said conditioning agent, said conditioning agent being incorporated in said polyolefin by dissolving said conditioning agent in a melt of the polyolefin and thereafter producing a shaped material from the resulting optically clear solution.

2. A shaped material according to claim 1 wherein said polyolefin is polyethylene.

3. A shaped material according to claim 1 wherein said polyolefin is polypropylene.

4. A shaped material according to claim 1 wherein said conditioning agent has a melting point of from about 160° C. to about 195° C. and an intrinsic viscosity in solvent solution of from about 0.6 to about 2.9 deciliters per gram.

5. A shaped material according to claim 1 wherein said polyolefin is a polypropylene of the isotactic type having a density ranging from about 0.89 to about 0.91 and a melting index (ASTM D-1238-57T, with load of 2160 grams) from about 0.5 to about 10.

6. A shaped material according to claim 1 wherein said conditioning agent is present in an amount of from about 10 to about 15% by weight.

7. A dyeable fiber consisting essentially of a polyolefin selected from the group consisting of polyethylene and polypropylene and dispersed therein a conditioning agent selected from the group consisting of fusible cellulose ethers and fusible substituted cellulose ethers having a melting point of from about 140 to about 240° C. and an intrinsic viscosity in solvent solution of from about 0.4 to about 3.5 deciliters per gram, said conditioning agent being present in an amount of from about 5% to about 50% by weight of the fiber, whereby said fiber is rendered more receptive to dyeing by the presence of said conditioning agent, said conditioning being incorporated in said polyolefin by dissolving said conditioning agent in a melt of the polyolefin and thereafter producing a shaped material from the resulting optically clear solution.

8. A process of chemically modifying a polyolefin textile material selected from the group consisting of polyethylene and polypropylene to render the same more receptive to dyeing which comprises dissolving a conditioning agent in said polyolefin, said conditioning agent being selected from the group consisting of fusible cellulose ethers and fusible substituted cellulose ethers having a melting point of from about 140 to about 240° C. and an intrinsic viscosity in solvent solution of from about 0.4 to about 3.5 deciliters per gram, said conditioning agent being present in an amount of from about 5% to about 50% by weight of the total solution, said solution being formed by melting said polyolefin and dissolving said conditioning agent therein.

9. A process according to claim 8 wherein the polyolefin is polyethylene.

10. A process according to claim 8 wherein the polyolefin is polypropylene.

11. A process according to claim 9 wherein the conditioning agent has a melting point of from about 160 to about 195° C. and an intrinsic viscosity in solvent solution of from about 0.6 to about 2.9 deciliters per gram.

References Cited

UNITED STATES PATENTS 2,864,783   12/1958   Cornwell _____ 260—17

FOREIGN PATENTS 238,546   2/1959   Australia.

WILLIAM H. SHORT, *Primary Examiner.*

J. NORRIS, *Assistant Examiner.*